United States Patent [19]

Kunkel

[11] 4,124,696

[45] Nov. 7, 1978

[54] METHOD FOR SEALING LEAKAGE ACROSS VALVES IN A SULFUR RECOVERY PLANT

[75] Inventor: Lorenz V. Kunkel, Naperville, Ill.

[73] Assignee: Standard Oil Company (Indiana), Chicago, Ill.

[21] Appl. No.: 848,974

[22] Filed: Nov. 7, 1977

[51] Int. Cl.² ............................................. C01B 17/04
[52] U.S. Cl. ................................ 423/574 R; 423/576; 252/411 S; 422/169
[58] Field of Search ........................ 423/573, 574, 576; 252/411; 23/262

[56] References Cited

U.S. PATENT DOCUMENTS

| | | | |
|---|---|---|---|
| 4,035,474 | 7/1977 | Kunkel et al. | 423/574 |
| 4,051,226 | 9/1977 | Staudinger et al. | 252/411 X |

OTHER PUBLICATIONS

Nobles, J. E.; "Design & Operation of First Amoco CBA Unit," paper presented, Mar. 1977; Univ. Oklahoma.

*Primary Examiner*—G. O. Peters
*Attorney, Agent, or Firm*—Robert B. Stevenson; Arthur McIlroy

[57] ABSTRACT

An improved method for reducing the sulfur losses associated with leakage across closed valves in a Claus type sulfur recovery plant involving the recirculating of low sulfur content Claus tail gas to the high pressure side of the closed valves. This improved method for compensating for leakage across a closed valve is particularly useful in sealing a valve in the so-called Cold Bed Adsorption plant. Thus, allowing a conventional carbon steel valve of an undercut design to be used at a temperature range from under 250° F to over 650° F while meeting contemporary emission standards.

3 Claims, 1 Drawing Figure

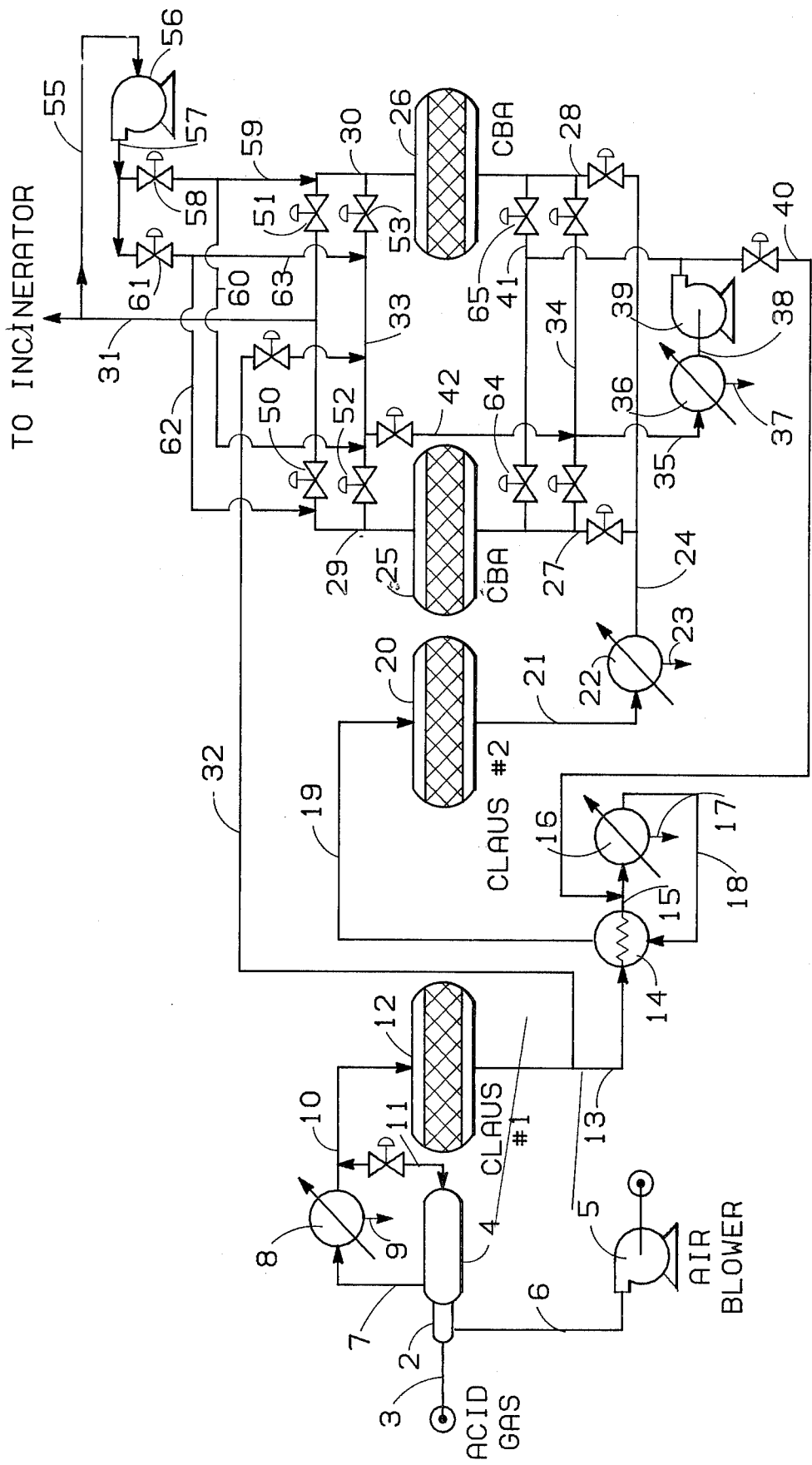

METHOD FOR SEALING LEAKAGE ACROSS VALVES IN A SULFUR RECOVERY PLANT

BACKGROUND OF THE INVENTION

1. Field of the Invention

The present invention relates to the valves associated with a commercial scale sulfur recovery process converting $H_2S$ and $SO_2$ to elemental sulfur. More specifically, it involves an improved method of preventing sulfur losses caused by leakage while protecting the valves from the corrosive environment.

2. Description of the Prior Art

In a contemporary commercial scale sulfur recovery plant, such as a Claus plant or Claus plant followed by a Cold Bed Adsorption reactor or the like, it is not uncommon to have as many as a dozen or more valves for switching the flow. These valves frequently are several feet in diameter and designed to withstand high concentrations of corrosive vapors such as $H_2S$ and $SO_2$ at temperatures which range from about 250° F to 650° F or even higher. With the advent of strict environmental emission laws, the degree of sulfur recovery has increased from the historic 80–90% recovery to 98–99% or better with commercial performance and performance guarantees being determined and specified to tenths of a percent. To achieve these conversion levels, the final reactor or reactors of a Claus plant are now being frequently operated at temperatures below the dew point of the sulfur vapors which ultimately requires high temperature regeneration of the reactor as exemplified in U.S. Pat. No. 4,035,474. Consequently, some of these very large valves have to give tight shutoff at the lower temperature as well as at the higher temperature. To further emphasize the problem quantitatively, a one-half percent leakage across certain valves in the Cold Bed Adsorption process can reduce recovery efficiency sufficiently to lower overall sulfur yield as much as 0.2%. Thus, the use of many conventionally constructed valves at critical points in the flow scheme is virtually prohibited.

SUMMARY OF INVENTION

In view of these problems I have discovered in a process for the catalytic conversion of a gaseous feed mixture containing hydrogen sulfide and sulfur dioxide to sulfur for the purpose of removing the sulfur wherein a valve is being employed which is subject to leakage when the valve is closed, thus reducing the efficiency of the sulfur removal, the specific improvement comprising; recycling a portion of an indigenous tail gas stream substantially free of sulfur and sulfur compounds to the high pressure side of the closed valve and injecting this recycle tail gas to the high pressure side of the valve at a rate equal to or slightly higher than the rate of leakage across the closed valve, thus reducing the amount of sulfur leaking past the valve.

In one embodiment of my invention the high pressure side of the valve receiving the substantially sulfur free tail gas is the sulfur rich side of the valve, thus the leakage is predominantly the tail gas entering the sulfur lean side of the valve. In another embodiment of my invention the substantially sulfur free tail gas is injected between two closed valves on the sulfur lean side of the valves temporarily making this side the high pressure side such that leakage is tail gas from the lean side into the sulfur rich side of the valves.

In this manner, conventional undercut valves with 1% or more leakage can readily be employed at considerable savings and capital investment. This improved method allows simple butterfly valves with as much as 5% leakage to be used to direct flow in the CBA sulfur process wherein the wide temperature variations result in and require such wide variations in sealing tolerances.

BRIEF DESCRIPTION OF THE DRAWINGS

FIG. 1 of the drawing is a simplified flow diagram illustrating how the present improvement can be incorporated into a typical commercial scale two-reactor Claus plant followed by a pair of CBA reactors.

DESCRIPTION OF THE PREFERRED EMBODIMENTS

The improved method for sealing a leaking CBA valve according to the present invention, how this improvement interrelates to the overall sulfur recovery process and a description of a commercial design supporting the use of this method can perhaps be best explained and understood by reference to the accompanying drawing. The drawing represents a simple, but general embodiment of the commercial scale CBA process involving a Claus furnace followed by two Claus catalytic reactors and a pair of CBA reactors. As illustrated in this drawing, acid gas containing hydrogen sulfide is introduced into furnace 2 via line 3 while a stoichiometric amount of air is also introduced by blower 5 via line 6. Within the furnace 2, a temperature in excess of about 2000° F converts noncatalytically a significant amount of $H_2S$ to elemental sulfur (typically 30–40% of the sulfur recovered). The hot furnace effluent is subsequently cooled to about 1100° F during the first pass through the waste heat boiler 4 and to 500° F during the second pass with commensurate steam production (not shown). The major portion of the boiler effluent leaving the waste heat boiler 4 is directed to the first sulfur condenser 8 via line 7. The liquified sulfur produced in the condenser 8 is removed via line 9 and sent to storage (not shown). The cooled noncondensed stream from condenser 8 leaves via line 10 and is commingled with a hot 1100° F bypass reheat stream from valved line 11 before entering the first Claus reactor 12. Within Claus reactor 12, catalytic conversion of $H_2S$ and $SO_2$ to elemental sulfur takes place with the effluent stream being directed to the second sulfur condenser 16 via line 13, heat exchanger 14, and line 15. Liquid sulfur produced within sulfur condenser 16 is removed via line 17 and sent to storage (not shown). The noncondensed stream from sulfur condenser 16 exits through line 18 and then passes through the other side of heat exchanger 14 before being sent on to the second Clause reactor 20 via line 19. Within the second Claus reactor 20, further catalytic conversion of $H_2S$ and $SO_2$ to elemental sulfur takes place with the effluent stream being directed to sulfur condenser 22 via line 21. Sulfur produced in sulfur condenser 22 is removed through line 23 and again directed to storage. The noncondensed stream from condenser 22 is then directed to CBA reactor 25 or CBA reactor 26 via line 24 and valved line 27 or via line 24 and valved line 28, respectively, depending upon which one is being operated in a cleanup mode and which one is being operated in a regeneration mode. If the first CBA reactor 25 is being operated in the cleanup mode, the stream entering through valved line 27 will undergo conversion of $H_2S$ and $SO_2$ to elemental sulfur with the sulfur being deposited onto the catalytic bed. A very lean H₂S stream will leave CBA reactor 25 through valved line 29 and be directed to the incinerator via line 31. In the meantime, the second CBA reactor 26 will be regenerating. Regeneration will involve withdrawing a hot H₂S and SO₂ rich stream via valved line 32 and directing this hot stream to the second CBA reactor 26 via valved line 33 and line 30. As the hot gases pass through the second CBA reactor 26, the previously deposited elemental sulfur will be removed and exit through valved line 28, valved line 34 and line 35 to sulfur condenser 36 wherein liquefaction of sulfur will take place. The liquefied sulfur from sulfur condenser 36 will be removed through line 37 and sent to storage, while the noncondensed phase exits through line 38, passes through blower 39 and returns back upstream to an appropriate place in the Claus process for further sulfur recovery via valved line 40 (in this case just prior to condenser 16). Having once removed the previously deposited sulfur in CBA reactor 26, the flow of the hot gaseous stream from valved line 32 is terminated and the CBA reactor 26 undergoes a recycle cooling step. Recycle cooling is accomplished by withdrawing the cool vapors from sulfur condenser 36 through line 38 to the inlet side of blower 39. The cool vapors are then delivered to the CBA reactor 26 by blower 39 via valved line 41. Vapors exiting CBA reactor 26 are then redirected to sulfur condenser 36 via line 30, valved line 33, valved line 42 and line 35, thus completing the cycle. During this recycle cooling step, the sulfur condenser 36 acts as a heat exchanger. For a more detailed description of such a process, see the previously mentioned U.S. Pat. No. 4,035,474.

During regeneration of the second CBA reactor 26, valves 50 and 53 are open while valves 51 and 52 are closed. Leakage across these closed valves, 51 and 52, represents a serious problem in that the high pressure side of the valves contain the hot H₂S and SO₂ rich gaseous stream from line 32, while the low pressure side contains sulfur lean CBA tail gas that ultimately is being released into the atmosphere. Thus, any leakage across these closed valves represents a direct sulfur loss and corresponds to a reduction in the percentage sulfur being recovered. It is this problem that the present invention is directed to and intended to alleviate. In this particular embodiment, sulfur lean tail gas is removed from line 31 via line 55 and directed to the inlet of blower 56. This tail gas is then delivered through line 57, open valve 58 and lines 59 and 60 to the high pressure side of valves 51 and 52. In this manner, the leakage across valves 51 and 52 during regeneration of CBA reactor 26 is preferentially a gas having very low sulfur content. During regeneration of CBA reactor 25, valve 58 is closed and valve 61 is open such that CBA tail gas from line 57 is directed through valve 61 to the high pressure side of valves 50 and 53 via lines 62 and 63. In this manner, the leakage across valves 50 and 53 is preferentially a gaseous composition low in sulfur content. The net result of performing the above described acts is, in essence, to seal the most critical valves during those times that leakage would be most detrimental to the overall sulfur recovery.

This tail gas sealing process can easily be extended to other valves and other overall flow schemes depending on the particulars of the plant and the relative flow occurring. However, careful analysis of the particular system usually will limit the application to specific points at specific times. Thus, for example, in the above described embodiment injection of seal gas during the CBA cooling step when the flow in valved line 32 is stopped is of minor importance, but injection of seal gas at the upstream side of the valve in valved line 32 may significantly reduce sulfur losses. Also, injection of seal gas between valves 64 and 65 during regeneration of either CBA reactor temporarily making this region slightly higher in pressure than the other sides will reduce leakage across these valves. But again, this is somewhat secondary in importance in that the leakage is upstream to a CBA reactor being operated in the cleanup mode, thus the gases escaping across the closed valve will still experience a Cold Bed Adsorption.

In one commercial scale embodiment of my invention operated similarly to what is illustrated in the above drawing, a set of two 46 inch carbon steel valves located downstream from the CBA reactors at positions equivalent to valves 50 and 51 and a set of two 36 inch carbon steel valves located at positions equivalent to valves 52 and 53 of a 890 long ton per day sulfur recovery unit were sealed by the injection of tail gas. A blower capacity of about 129% of the anticipated leakage (817 SCFM) was provided and has proven to be effective in reducing sulfur losses.

I claim:

1. In a process for the catalytic conversion of gaseous feed mixture containing hydrogen sulfide and sulfur dioxide to sulfur for the purpose of removing said sulfur wherein a valve is being employed which is subject to leakage when said valve is closed, thus reducing the efficiency of the sulfur removal, the specific improvement comprising; recycling a portion of an indigenous tail gas stream substantially free of sulfur and sulfur compounds to the high pressure side of said closed valve and injecting said recycled tail gas to said high pressure side of said valve at a rate equal to or slightly higher than the rate of leakage across said closed valve, thus reducing the amount of sulfur and sulfur compounds leaking past said valve.

2. A process of claim 1 wherein the side of the valve to which said tail gas is injected is the side containing the sulfur rich stream thus leakage involves said tail gas entering the sulfur lean stream.

3. A process of claim 1 wherein said injecting occurs between two closed valves making the region between the valves the said high pressure side such that leakage involves said tail gas passing from between the closed valves into the sulfur rich side of the valves.

* * * * *